UNITED STATES PATENT OFFICE.

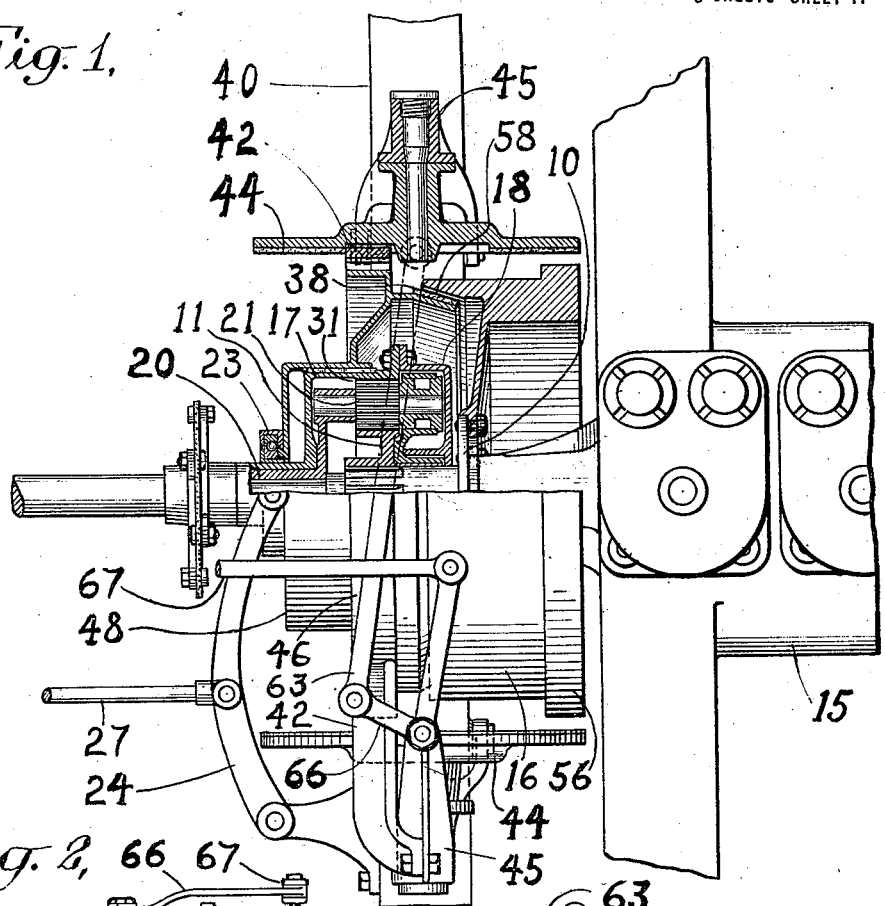
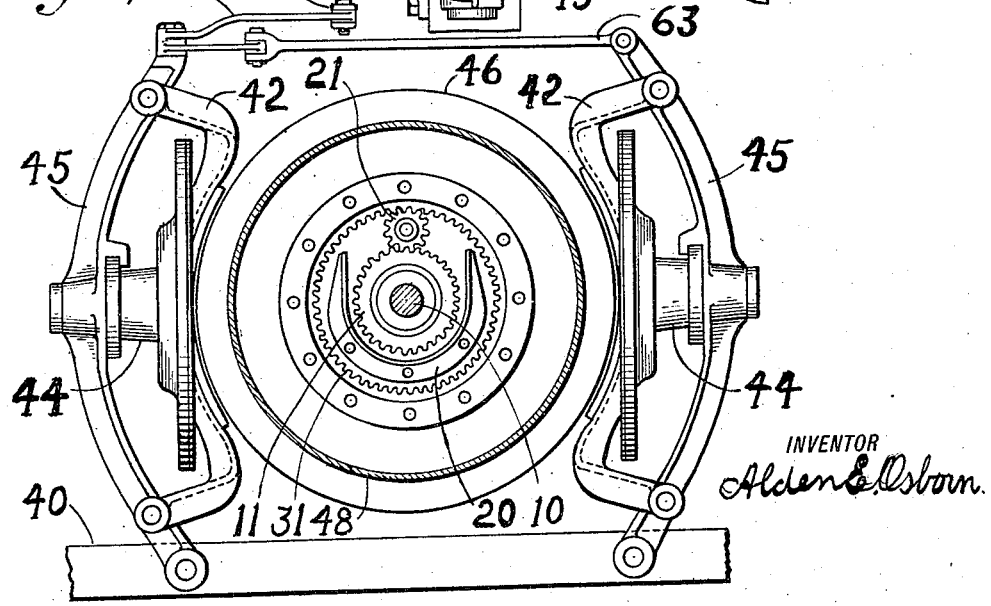

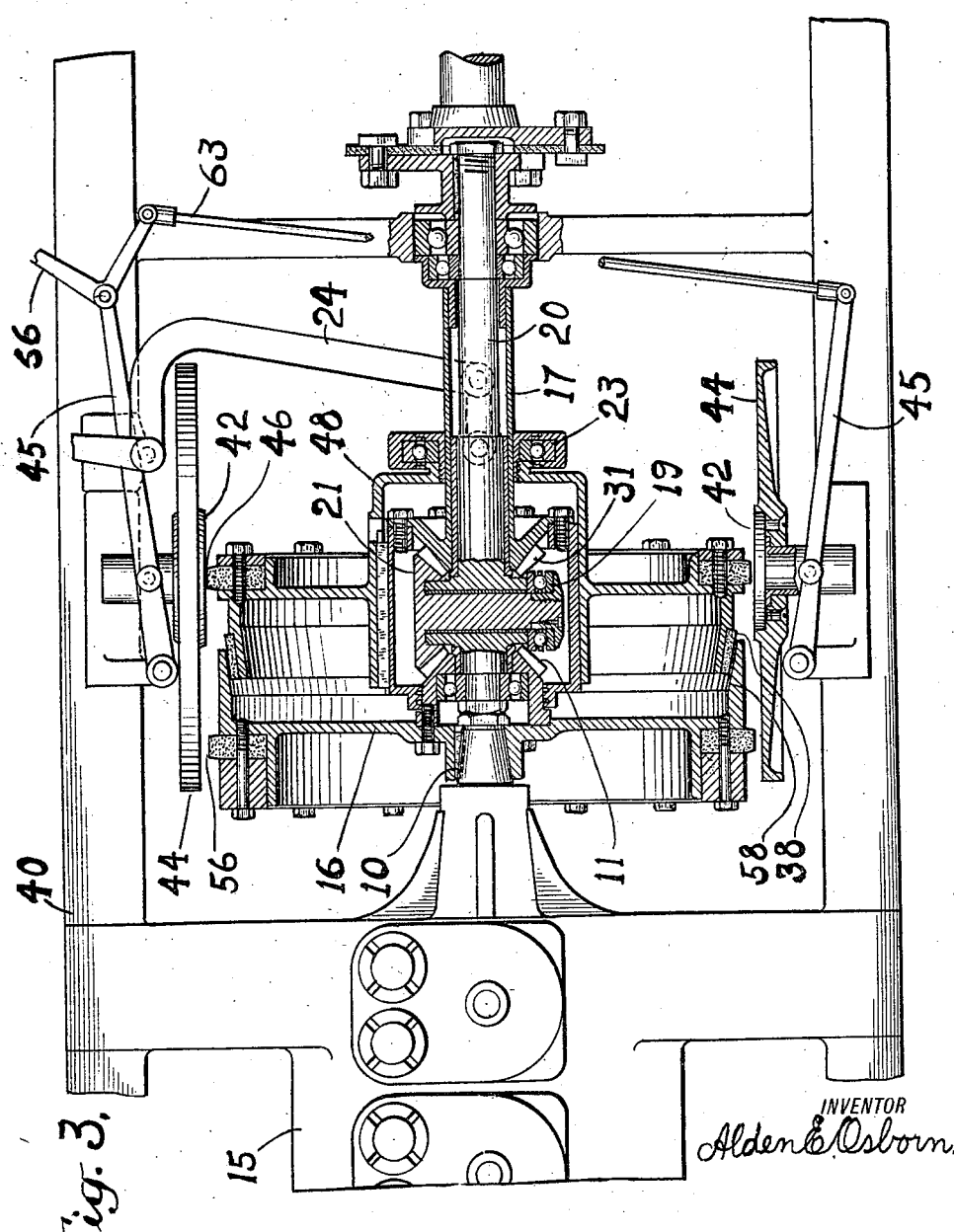

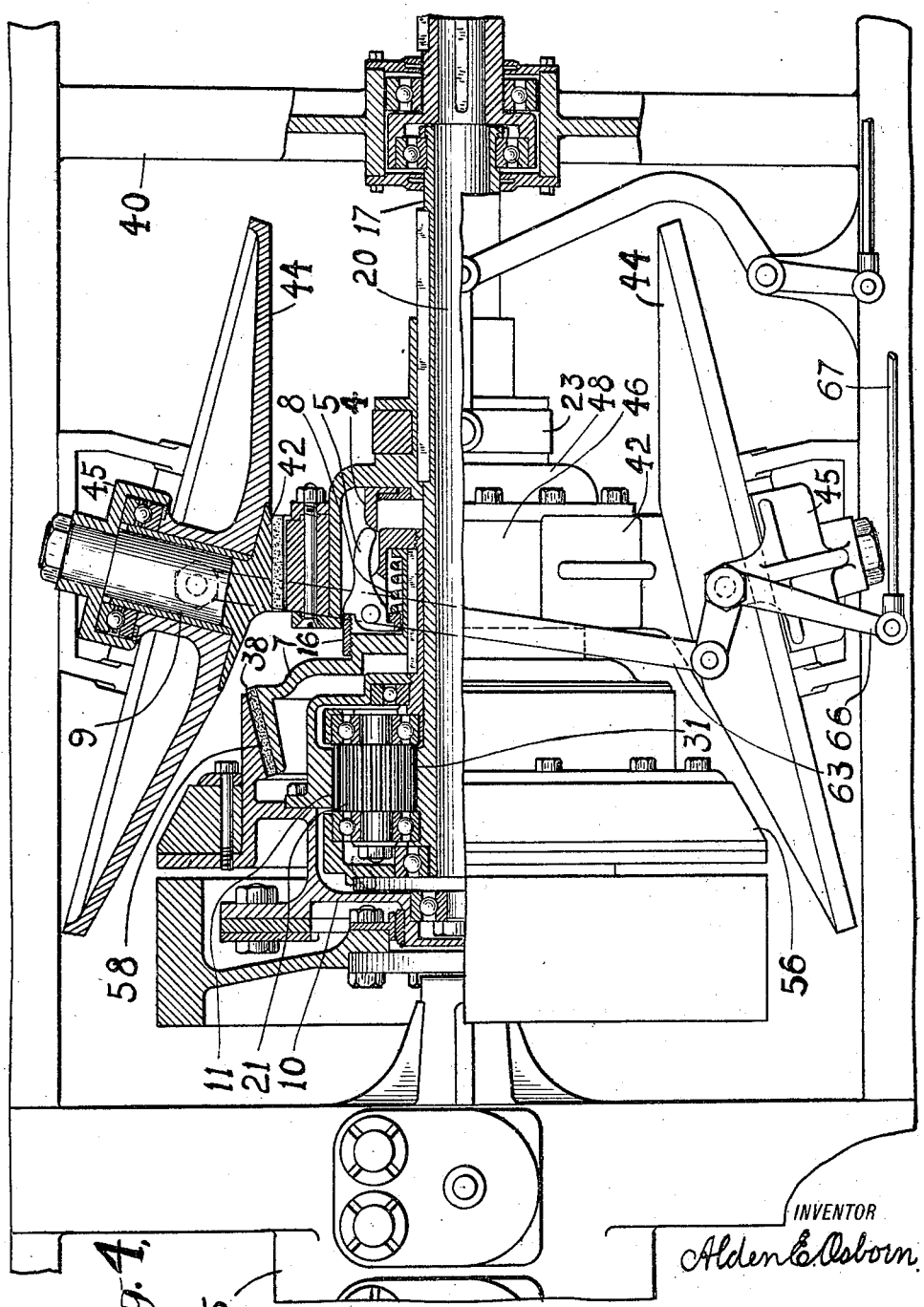

ALDEN E. OSBORN, OF NEW YORK, N. Y.

TRANSMISSION GEARING.

1,412,214.  Specification of Letters Patent.  Patented Apr. 11, 1922.

Application filed April 24, 1919. Serial No. 292,385.

*To all whom it may concern:*

Be it known that I, ALDEN E. OSBORN, a citizen of the United States, and resident of New York city, in the county of the Bronx and State of New York, have invented certain new and useful Improvements in Transmission Gearing, of which the following is a specification.

My invention relates to certain improvements in transmission gearing of the type illustrated in my Patents No. 995,552 dated June 20, 1911 and No. 1,213,531 dated Jan. 23, 1917 whereby such gearing is not only considerably simplified but is, moreover, so arranged that its action can be entirely regulated by control connections giving the required movements to two of its members only thus also simplifying the operating mechanism.

In the accompanying drawings Figure 1 represents a longitudinal partial sectional view of a simple form of my invention; Figure 2 represents a vertical sectional view of the mechanism shown in Figure 1; Figure 3 represents a longitudinal sectional view of a modification of Figures 1 and 2 and Figure 4 represents a longitudinal partial sectional view of a still further modification.

In Figure 1, 10 indicates the driving element, in this figure shown as the main supporting shaft, and 20 indicates the driven element which is in the form of a sleeve rotatable upon said driving element. The driving element 10 carries one of the gears 11 of the planetary gear system while the driven element 20 carries the pinion gear 21 of said gear system: the third gear 31 of which is carried by the mount 17 which part forms, with the cover 18, an enclosing case for the gearing. The driving element 10 is arranged to carry the wheel 16 which, while not necessarily forming the flywheel of the motor or prime mover 15, is shown as having that function as well as having a part in this transmission mechanism by being provided with a cone surface 58 for the clutch 38 and with a frictional driving surface 56 designed to co-operate with the intermediate gears or friction disks 44 that are rotatably carried by levers 45 pivotally mounted on the framing 40. These levers 45 also carry the brake shoes 42 which pass across the face of the disks 44 near their centers and are raised slightly above, for reasons obvious later, the level of the face of the discs. The levers 45 are connected by the rod 63 and levers 66 to the rod 67 in such a way that by moving the rod 67 these levers 45 may be moved nearer together or further apart as desired by the operator. The mount 17 is arranged to carry a drum or wheel 48 which drum is provided with a frictional driving or working surface 46 having the same diameter as the frictional surface 56 on the wheel 16 and is arranged so that it can be slid along the mount 17 in order that this frictional driving surface 46 can be brought either between the surfaces on the discs 44 or between the brake shoes 42—this sliding movement of the drum 48 being controlled through the collar 23, lever 24 and rod 27. The drum 48 also carries another friction surface 38 which surface can co-operate with the cone surface 58 on the wheel 16 these parts forming a cone clutch which locks the gear system together so that it will rotate as a unit when the surfaces 38 and 58 are forcibly brought into contact.

The operation of this form of my invention is as follows: When the driving element 10 is rotating with the driven element 20 standing the gear 11 turns the intermediate pinion 21 and causes the gear 31 and parts connected thereto to revolve backward idly without transmitting any motion through to the driven element. To rotate the driven element 20 at low speed the restrainable member drum 48 is placed in such a position that the surface 46 would come within the brake shoes 42 so that when the shoes are brought together by pulling, through a convenient means, the controlling rod 67, the drum 46, restrainable mount 17 and gear 31 would be held from rotation and the pinion 21 caused to roll around, by the motion of the gear 11, within said gear 31 and carry the driven element 20 with it but at a lower speed than that at which the gear 11 and driving element 10 rotate. To rotate the driven element 20 at full speed the restrainable mount drum 48 is shifted to bring the clutch surfaces 38 and 58 into contact which by preventing the gears 11, 21 and 31 from revolving causes the whole gear to turn as a unit and with the driving and driven elements locked from relative motion. To obtain the reverse the mount drum 48 is moved away from the flywheel 16 so that the surface 46 comes on the opposite side of the brake shoes 42 from the wheel surface 56 and the shoes are again brought toward each other when (as the shoes 42 do not now come into contact with the drum surface 46) the working or driving surface of the intermediate wheels or discs 44 are engaged with the flywheel surface 56 and the drum surface 46 causing the restrainable mount 17 to be driven backward at a higher speed in relation to the driving element parts than it normally revolves and thus, through the action of the gears 11, 21 and 31, carry the driven element backward with it. It will be noticed that, provided the driving surfaces on the discs 44 are wide enough, if a very slow reverse or a low forward speed or even if restraint of all motion of the driven element is desired it is possible to obtain these results by placing the restrainable mount drum 48 between the position where the surface 46 is within the brake shoes 42 and its extreme reverse position as just described and engaging the working surfaces on the intermediate disc 44 with the drum surface 46 and wheel surface 56 so as to give the desired speed to the restrainable mount 17 and retard its motion or drive it backward faster than the gears according to the distance of the point of driving contact of the surface 46 from the axis of rotation of the discs.

In Figure 3 is shown a slight modification of Figures 1 and 2 in that bevel gearing is used in place of the spur and internal gears and the intermediate disc and brake mounting and operating arrangements have been changed. The driving element wheel 16 carries the gear or frictional driving surface 56 and the clutch surface 58 and is connected to the driving bevel gear 11 of the gear system which gear meshes with the intermediate bevel pinion 21 which pinion is rotatably mounted on the driven element 20 and in turn meshes with the bevel gear 31 on the restrainable mount 17 which mount carries slidably the drum or wheel 48 having the gear or frictional driving surface 46. The pinion 21 is shown as arranged, in order to give it a relatively long supporting bearing, with its shaft, which is illustrated as being integral with it, passing right through the driven element 20 with a ball thrust bearing 19 on the opposite side of the axis of said member from said pinion.

The levers 45 carrying the intermediate gear or discs 44 and the restraining brake shoes 42 (which are shown as slightly raised spherically faced hub ends of the intermediate discs) are arranged to operate horizontally, through actuating the rod 63 and lever 66, instead of vertically as in Figures 1 and 2 and also as in Figure 4 hereinafter described. This difference in mounting is immateiral so far as its effect on the operation of my invention is concerned and may be used with Figures 1, 2 and 4 or the arrangement shown in those Figures can be used to equal advantage with the form of my invention now being described.

The operation of this form of my invention is practically the same as the operation of the form shown in Figures 1 and 2 and similar parts, as indicated by similar reference figures, come into action except for the difference in speed ratios given by the use of the bevel gears 11, 21 and 31 causing the driven element 20 to rotate much faster in relation to the driving element 10 when the restrainable mount 17 is held stationary by bringing the brake shoes or disc centers 42 forcibly against the driving surface 46. Owing to this change in gear ratio it is obvious that if the intermediate discs 44 are engaged when the wheel or drum surface 46 is at an equal distance from their axis of rotation as is the surface 56 no motion would be transmitted to the driven element 20, since the gears 11 and 31 are of the same size, while if the drum 48 is shifted so that its surface 46 is nearer to the axes of the discs 44, thus retarding the speed of the mount 17 and gear 31 in relation to the gear 11, the driven element 20 would be carried slowly ahead in the same direction as the driving element 10 and gear 11 rotate while if the drum 48 is shifted in the opposite direction away from the discs' centers, it and the gear 31 would, when the discs are engaged, be given a higher speed than the driving element 10 and gear 11 and carry the driven element 20 backward with it.

In Figure 4 is shown a more elaborate form of my invention than those forms previously illustrated and one in which a still higher speed is given to the driven element 20 in relation to the driving element 10, when the restrainable mount 17 is kept from revolving, than is the case with Figure 3. In this form the driving element 10 carries the clutch surface 58 and driving or gear surface 56 and the gear 11 of the gear system which is the internal gear member of that system. This gear 11 meshes with the pinion 21 rotatably mounted on the driven element 20 which meshes in turn with the gear 31 carried by the mount 17 which also carries the sliding drum or wheel 48. While thus drum may, like Figures 1, 2 and 3, carry the member 38 of the clutch for locking the parts for the direct drive I have, in this figure, shown a modified arrangement wherein, while the sliding of the drum 48 brings the clutch surfaces 38 and 58 into engagement, it does so through the medium of the tapered collar or spool 4, the pivoted levers 5 and adjusting collar 16. It will be noticed that the clutch surface 38 is mounted on the member 7 which is slidably keyed to an extension of the driven element 20 so that when the clutch surfaces 38 and 58 are engaged the driving and driven elements are locked directly together independently of the gears 11, 21 and 31. In order to disengage the clutch a spring 8 is provided. As, owing to the fact that the gear 31 is smaller than the gear 11, the restrainable member is revolved at a higher speed than the driving element it is desirable to reduce the diameter of the driving surface 46 on the restrainable mount drum 48 below that of the driving element surface 56 and for this reason the intermediate discs 44 are shown as made with a conical gear surface and the levers 45 are pivoted on the framing 40 at an oblique angle with the axis of the gear. A suitable lever 66 and operating rods 63 and 67 are provided for bringing the intermediate gears or discs 44 and brake shoes 42 into engagement. It will be noticed that the brake shoes 42 are supported on the ends of the shafts 9 carrying the intermediate gears 44 but of course other arrangements of the restraining shoes may be used.

The operation of this form of my invention will be readily understood from the description of the operation of Figures 1, 2 and 3 the only differences being in the altered gear ratio and the less direct, but readily understood, operation of the locking clutch for the direct drive. It will be noticed that, with the constructions shown in Figures 1, 2 and 3 in which the clutch 38 and 58 are revolved in opposite directions by the gearing, the pull on the clutch to transmit a given amount of power would be less than is needed on a clutch transmitting motion directly between the driving and driven elements as in this Figure 4 thus making it possible to use the simple arrangement shown in Figures 1, 2 and 3 of having the thrust bearing 23 hold the clutch parts in driving contact on the direct drive without excessive wear or loss of power. It should be understood, however, that this dog operated clutch of Figure 4, connecting the driving and driven elements directly, may be used with the gearing of Figures 1, 2 and 3 or that other forms of clutch may be employed such changes in the design of the locking clutch being obvious to those skilled in the art and not altering the principle involved in my invention and as hereinafter defined in the claims. It is further obvious that if the greatest simplicity is desired and particularly if the gear is to be used with low powers, it is not necessary to employ two sets of intermediate gears and brake shoes as obviously one set will operate just as well if the pressure sideways on the gear is not more than is required for small powers. In this case the intermediate gear and brake shoe may press upon the gear from any angle although I prefer, if possible, to have it act from under the gearing and thus lift up on it and cause the pressure to be to a certain extent counteracted by the weight of the gear. In the larger sizes of this transmission gearing the use of duplicate intermediate gears and brake shoes to drive or restrain the mount 17 is believed preferable as the pressure and pull is equalized in all directions thereby reducing the frictional loss and wear on the different parts.

Having thus described my invention what I claim is:

1. In a transmission gearing the combination of a stationary framing, a planetary gear system, a rotary driving element having connection with an element thereof, a rotary driven element having connection with another element thereof and a rotary mount having connection with still another element thereof, a longitudinally slidable member on said rotary mount, means, supported by said stationary framing, for stopping the motion of said slidable member and rotary mount connected thereto and means for positively driving said slidable member and rotary mount independently of the gear system, the action of either one of said means upon said slidable member and rotary mount being dependent upon the longitudinal position of said slidable member in relation thereto.

2. In a transmission gearing the combination of a stationary framing, a planetary gear system, a rotary driving element having connection with a gear thereof, a rotary driven element having connection with another gear thereof and a rotary mount having connection with still another gear thereof, a longitudinally slidable member on said rotary mount, means, supported by said stationary framing, for stopping the rotation of said slidable member and rotary mount connected thereto when said slidable member is in one of its positions upon said mount and means, also supported by said stationary framing, for positively driving said slidable member and rotary mount independently of the gear system when said slidable member is in another of its positions upon said mount.

3. In a transmission gearing the combination of a stationary framing, a planetary gear system, a rotary driving element having connection with a gear thereof, a rotary driven element having connection with another gear thereof and a rotary mount having connection with still another gear thereof, a longitudinally slidable member on said rotary mount, means, supported by said stationary framing, for stopping the rotation of said slidable member and rotary mount connected thereto when said slidable member is in one of its positions upon said mount and means, also supported by said stationary framing, acting to positively drive said slidable member and rotary mount independently of the gear system and at a faster speed than said system when said slidable member is in another of its positions upon said mount and to positively drive said slidable member and rotary mount independently of the gear system and at a slower speed than said gear system when said slidable member is in still another of its positions upon said mount.

4. In a transmission gearing the combination of a stationary framing, a planetary gear system, a rotary driving element having connection with a gear thereof, a rotary driven element having connection with another gear thereof and a rotary mount having connection with still another gear thereof, a longitudinally slidable member on said rotary mount, means, supported by said stationary framing, for stopping the rotation of said slidable member and rotary mount connected thereto when said slidable member is in one of its positions longitudinally upon said mount and means for locking the driving and driven elements to turn as a unit when said slidable member is brought into another position longitudinally upon said mount.

5. In a transmission gearing the combination of a stationary framing, a planetary gear system, a rotary driving element having connection with a gear thereof, a rotary driven element having connection with another gear thereof and a rotary mount having connection with still another gear thereof, a longitudinally slidable member on said rotary mount, means, supported by said stationary framing, for stopping the rotation of said slidable member and rotary mount connected thereto when said slidable member is in one of its positions longitudinally upon said mount, means, also supported by said stationary framing, acting to positively drive said slidable member and rotary mount independently of the gear system and at two or more different speeds depending on the position longitudinally of said slidable member when said positive driving means is put in engagement with the slidable member and means for locking the driving and driven elements to turn as a unit when said slidable member is brought into another position longitudinally upon said mount.

6. In a transmission gearing the combination of a stationary framing, a planetary gear system, a rotary driving element having connection with a gear thereof, a rotary driven element having connection with another gear thereof and a rotary mount having connection with still another gear thereof, a longitudinally slidable member on said rotary mount, means, supported by said stationary framing, for stopping the rotation of said slidable member and rotary mount connected thereto, means, also supported by said stationary framing, acting to positively drive said slidable member and rotary mount independently of the gear system and a single controlling member for bringing by its movement either one or the other of said means into action according to the position longitudinally of said slidable member upon said rotary mount.

7. In a transmission gearing the combination of a stationary framing, a planetary gear system, a rotary driving element having connection with a gear thereof, a rotary driven element having connection with another gear thereof and a rotary mount having connection with still another gear thereof, means for stopping the rotation of said mount or for positively driving said mount from the driving element, comprising co-operative parts mounted on said stationary framing and a member mounted on said rotary mount and being longitudinally shiftable at will along its axis of rotation, whereby when said member is shifted to different positions longitudinally on said mount different rates of rotation in relation to said driving element may be given to said mount by said co-operating parts on said stationary framing or it may be held from rotation by said parts, and means whereby, when said shiftable member is so held from rotation by said parts, said parts are disconnected from said driving element.

8. In a transmission gearing the combination of a stationary framing, a planetary gear system and having a driving gear surface, a rotary driving element having connection with said gear system, a rotary driven element also having connection with said gear system and a rotary mount also having connection with said gear system and also having a driving gear surface, and controllable means for operatively connecting said driving element and rotary mount independently of the gear system comprising a plurality of discs rotatively mounted on said stationary framing and having gear surfaces adapted to engage said gear surfaces on said driving element and rotary mount and means for simultaneously bringing the surfaces of all said discs into operative engagement with said driving element and rotary mount gear surfaces.

9. In a transmission gearing the combination of a stationary framing, a planetary gear system, a rotary driving element having connection with said gear system and having a driving gear surface, a rotary driven element also having connection with said gear system and a rotary mount also having connection with said gear system and also having a driving gear surface, and controllable means for operatively connecting said driving element and said rotary mount independently of the gear system comprising two discs rotatably mounted on said stationary framing at substantially opposite sides of the axes of rotation of said driving element and rotary mount and having gear surfaces adapted to engage said gear surfaces on said driving element and rotary mount and means for simultaneously bringing the surfaces of both said discs into operative engagement with said driving element and rotary mount gear surfaces whereby the driving pressure and torque upon said driving element and rotary mount shall be substantially equalized.

10. In a transmission gearing the combination of a stationary framing, a gear system, a rotary mount having connection with said gear system and having a gear surface, a disc rotatably mounted on said framing and having a gear surface adopted to engage said gear surface on the mount, controllable means for moving said disc to bring its gear surface into co-operation with the gear surface on the mount and means also movable with said disc for co-operating with said mount to prevent its rotation.

11. In a transmission gearing the combination of a stationary framing, a gear system, a rotary mount having connection with said gear system and having a gear surface, a disc also having a gear surface adapted to co-operate with the gear surface on said mount rotatably mounted on said framing with its axis of rotation at an angle to the axis of rotation of said mount and arranged so that it can at will be brought toward or away from said mount, a braking means connected with said disc so as to be movable therewith toward or away from said mount and means whereby either said disc gear surface can co-operate with said mount gear surface to regulate the speed of said mount or said braking means can co-operate with said mount to stop said mount's rotation, when said parts are brought toward said mount.

12. In a transmission gearing the combination of a planetary gear system comprising a series of bevel or miter gears, a rotary driving element having connection with one of said gears, a rotary mount having connection with another of said gears and having its axis of rotation concentric with the axis of rotation of said driving element, and a rotary driven element also having its axis of rotation concentric with the axis of rotation of the driving element and rotatably supporting still another of said gears, and a shaft for this last named gear extending across the axis of rotation of said elements and having means on the opposite side of said axis of rotation of said elements from said last named gear to take the thrust of said gear.

13. In a transmission gearing the combination of a stationary framing, a planetary gear system, a rotary driving element having connection with an element thereof, a rotary driven element having connection with another element thereof and a rotary mount having connection with still another element thereof, a longitudinally slidable member on said rotary mount, means, supported by said stationary framing, for stopping the motion of said slidable member and rotary mount connected thereto when said slidable member is in one of its positions longitudinally upon said mount, means for operatively connecting said driving element and said slidable member independently of the gear system when said slidable member is at one side of said restraining means and means for locking the driving and driven elements to turn as a unit when said slidable member is moved to the opposite side of said restraining means.

14. In a transmission gearing the combination of a stationary framing, a planetary gear system, a rotary driving element having connection with an element thereof and having a driving gear surface, a rotary driven element having connection with another element thereof and a rotary mount having connection with still another element thereof, a longitudinally slidable member on said rotary mount and also having a driving gear surface, a disc rotatably mounted on said stationary framing and having a gear surface adapted to engage said gear surfaces on said driving element and slidable member when said slidable member is shifted into one of its longitudinal positions and to transmit motion between the driving element and slidable member independently of the gear system, and a movable shoe adapted to be brought into forcible engagement with the slidable member when the slidable member is shifted to another of its longitudinal positions and means, acting when the said shoe is thus engaged with the slidable member, to hold said disc out of engagement with its cooperating gear surfaces on the driving element and the slidable member.

In witness whereof, I have hereunto set my hand this 23rd day of April, 1919.

ALDEN E. OSBORN.